(12) United States Patent
Defoort

(10) Patent No.: US 7,702,080 B2
(45) Date of Patent: Apr. 20, 2010

(54) METHOD AND APPARATUS FOR LOCALIZING IN-HOUSE WIRING DEFECTS

(75) Inventor: Frank Cyriel Michel Defoort, Kruibeke-Bazel (BE)

(73) Assignee: Alcatel-Lucent, Paris (FR)

( * ) Notice: Subject to any disclaimer, the term of this patent is extended or adjusted under 35 U.S.C. 154(b) by 1083 days.

(21) Appl. No.: 11/366,381

(22) Filed: Mar. 3, 2006

(65) Prior Publication Data
US 2006/0198500 A1 Sep. 7, 2006

(30) Foreign Application Priority Data
Mar. 4, 2005 (EP) ................................ 05290496

(51) Int. Cl.
H04M 1/24 (2006.01)
H04M 3/08 (2006.01)
H04M 3/22 (2006.01)

(52) U.S. Cl. ................. 379/29.08; 379/1.01; 379/29.01

(58) Field of Classification Search ................ 379/1.01, 379/1.03, 1.04, 9.02, 14.01, 15.05, 22.03, 379/27.01, 28, 29.01, 29.08
See application file for complete search history.

(56) References Cited

U.S. PATENT DOCUMENTS
6,108,404 A * 8/2000 Hardy et al. .................... 379/21
7,106,834 B2 * 9/2006 Macdonald et al. ......... 379/1.04
7,298,828 B2 * 11/2007 Lysaght et al. ........... 379/22.01

FOREIGN PATENT DOCUMENTS
FR 2 825 545 A 12/2002
GB 2 300 784 A 11/1996

OTHER PUBLICATIONS

Eichen E et al.: "DSTS: An expert system for diagnosis of advanced digital subscriber services." Network Operations and Management Symposium, 1998. NOMS 98., IEEE New Orleans, LA, USA Feb. 15-20, 1998, New York, NY, USA, IEEE, US, vol. 3, Feb. 15, 1998, pp. 795-804, XP010267445 ISBN 0-7803-4351-4.

* cited by examiner

Primary Examiner—Quoc D Tran
(74) Attorney, Agent, or Firm—Harness, Dickey & Pierce

(57) ABSTRACT

The present invention relates to a method for localizing a defect in a in-house access plant operable to carry broadband communication services.

Figure 1:
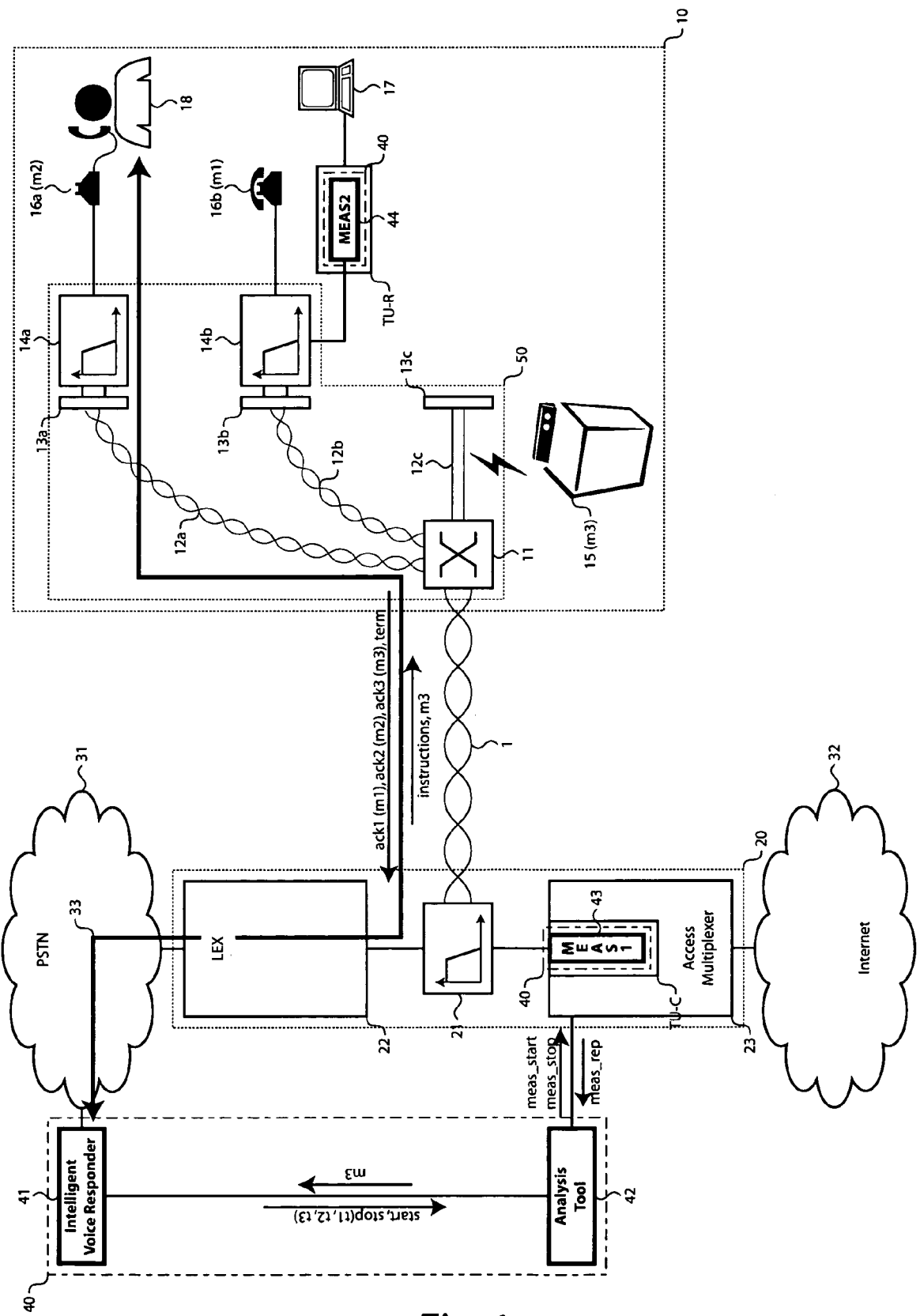

A method according to the invention further comprises the steps of:
  instructing a user of said in-house access plant to manipulate in-house equipment through an automated and interactive communication session,
  determining timing information for each manipulation that is carried out,
  performing remote quality measurements over said in-house access plant while said in-house equipment are being manipulated,
  identifying from said timing information a particular manipulation that is time-correlated with a substantial change in measured quality,
thereby identifying a particular piece of in-house equipment that has been manipulated and in the neighborhood of which said defect is located.

The present invention also relates to an analysis tool such as a network analyzer, a communication unit such an intelligent voice responder or a web server, and to a diagnostic system.

10 Claims, 2 Drawing Sheets

METHOD AND APPARATUS FOR LOCALIZING IN-HOUSE WIRING DEFECTS

The present invention relates to a method for localizing a defect in a in-house access plant operable to carry broadband communication services, such as Digital Subscriber Line (xDSL) communication services.

Faults and issues in physical wiring between customer premises equipment and central office are particularly prejudicial for high demanding applications like video streaming, gaming, etc.

Many of those faults and issues are located inside the customer premises. Examples of such faults and issues are missing or defective splitters, badly twisted or shielded copper pairs which pick up ingress noise from radiating in-house electro-equipment, etc.

Detection and resolution of in-house wiring problems usually require a human intervention, that is to say a costly truck roll of a highly-qualified technician to the end-user's house to analyze the in-house wiring.

It is an object of the present invention to define a cheaper and still liable method for localizing and fixing in-house wiring problems.

According to the invention, this object is achieved due to the fact that said method comprises the steps of:
- establishing an automated and interactive communication session with a user of said in-house access plant,
- instructing said user through said communication session to manipulate in-house equipment,
- determining timing information for each manipulation that is carried out,
- performing remote quality measurements over said in-house access plant while said in-house equipment are being manipulated,
- identifying from said timing information a particular manipulation that is time-correlated with a substantial change in measured quality, thereby identifying a particular piece of in-house equipment that has been manipulated and in the neighborhood of which said defect is located.

Quality measurements are synchronized with an automated and interactive communication process instructing a user at customer premises to manipulate in-house equipment. By so-doing, one can identify automatically a particular in-house equipment, the manipulation of which has caused a substantial change in measured quality, and in the neighborhood of which the defect is likely to be located.

Quality measurements primarily consist of injecting a signal that propagates through the in-house access plant, and of measuring up to which extent the signal is disturbed.

The measurement unit can be located at various places, such as at a central office, at customer premises, at an intermediate location between the central office and the customer premises, etc.

The measurement unit can be housed by various equipment, such as a broadband test device, an access multiplexer, a modem, a set top box, a network interface card, a router, a bridge, etc.

A method according to the invention is advantageous in that support and/or intervention of a highly-qualified technician is no longer required.

The procedure can be triggered by the end-user as many times as it is necessary, e.g. for fine-tuning the broadband connection or for achieving a certain service level.

An embodiment of a method according to the invention is characterized in that said identification step is performed by said user, and in that said method further comprises the step of instructing said user through said communication session to take notice of times at which said in-house equipment are manipulated, thereby determining said timing information.

In this embodiment, the user writes the time down whenever a new piece of in-house equipment is manipulated. In a further step, the user is returned a reference time at which quality substantially changed. The user may also be returned a measurement report synthetizing the quality measurements that have been performed over the in-house access plant while in-house equipment were being manipulated. In the last step, the user identifies which particular manipulation is time-correlated with the reference time or with a substantial change in measured quality.

This embodiment is particularly advantageous when the measurements need to be spread over a long period. The communication session can be momentarily interrupted while in-house equipment are being manipulated, thereby reducing the communication cost.

Another embodiment of a method according to the invention is characterized in that said identification step is performed by means of an analysis tool, and in that said method further comprises the step of receiving through said communication session an interactive signal for said each manipulation, whereby said timing information are derived.

Interactive signals are explicit acknowledgment (or confirmation) signals issued by the user, such as pushing a particular key or a particular key combination, pronouncing a particular word or a particular group of words (decoded by means of speech recognition), etc, or implicit signals, such as a connect control signal when a phone gets off-hook, a call termination signal when a phone gets on-hook, etc.

This embodiment is advantageous in that troubleshooting is automated at a further extent (the user does not need to make any time-correlation by himself), and in that the end-user is provided with a clear, tangible and accurate output for localizing the defect, such as the manipulation chronological number to which the defect is related.

A further embodiment of a method according to the invention is characterized in that said communication session is a phone call guided by an intelligent voice responder.

This embodiment is particularly advantageous in that broadband services do not need to be enabled for troubleshooting the in-house access plant.

This embodiment is further advantageous if mobile communication is used: the user can manipulate the in-house equipment without restraint while listening to the instructions and acknowledging each manipulations.

Another embodiment of a method according to the invention is characterized in that said communication session is based upon a web interface.

This embodiment is advantageous in that further detailed information can be returned to the user, such as a detailed measurement report, support information for troubleshooting the plant, etc.

Still a further embodiment of a method according to the invention is characterized in that said defect is a missing or defective splitter separating a broadband signal from a narrowband signal, and in that said user is instructed to unplug narrowband devices.

Splitters are devices that separate a narrowband signal, such as the Plain Old Telephony Service (POTS) signal, from a broadband signal for connection towards a narrowband device, such as a phone set, a fax machine etc, while providing a broadband device with connectivity to the unfiltered line signal.

A missing or defective splitter causes a part of the narrowband signal to leak into higher frequencies because of the non-linear behavior of the narrowband device, and induces extra-noise on the broadband connection.

Another embodiment of a method according to the invention is characterized in that said defect is bad quality in-house wiring, and in that said user is instructed to switch on or off in-house electro-equipment possibly causing noise increase or decrease on said in-house access plant through radiations picked up by said bad quality in-house wiring.

Incorrectly twisted and/or shielded conductor pairs, e.g. that are sometimes installed by unqualified people for connecting a new location within the customer premises to the access plant, are very sensitive to background noise, such as induced by a dimmer, an engine, an electrical pump, a washing machine, an hair dryer, etc.

By switching on or off such an interfering electro-equipment, line quality substantially lessens or improves respectively. The bad quality in-house wiring is likely to be located in the vicinity of that electro-equipment.

The present invention also relates to an analysis tool adapted to send a control signal whereupon remote quality measurements are performed over a in-house access plant operable to carry broadband communication services.

An example of such an analysis tool is the Alcatel™ 5530 network analyzer.

An analysis tool according to the invention is operable to form part of a diagnostic system capable of localizing a defect in said in-house access plant, and is further adapted:
  to synchronize said control signal with an automated and interactive communication session established with a user of said in-house access plant, though which said user is instructed to manipulate in-house equipment, and through which an interactive signal is received for each manipulation that is carried out,
  to identify, from timing information derived from said interactive signal and related to said each manipulation, and from said remote quality measurements, a particular manipulation that is time-correlated with a substantial change in measured quality, thereby allowing identification of a particular piece of in-house equipment that has been manipulated and in the neighborhood of which said defect is located.

The present invention also relates to a communication unit adapted to establish an automated and interactive communication session with a user of a in-house access plant operable to carry broadband communication services.

Examples of such a communication unit are an intelligent voice responder, a web server, etc.

A communication unit according to the invention is operable to form part of a diagnostic system capable of localizing a defect in said in-house access plant, and is further adapted:
  to instruct said user through said communication session to manipulate in-house equipment,
  to receive through said communication session an interactive signal for each manipulation that is carried out, whereby timing information related to said each manipulation are derived,
  to send a synchronization signal whereupon remote quality measurements are performed over said in-house access plant, which remote quality measurements being performed while said in-house equipment are being manipulated, thereby allowing identification, from said timing information and from said remote quality measurements, of a particular manipulation that is time-correlated with a substantial change in measured quality, and further of a particular piece of in-house equipment that has been manipulated and in the neighborhood of which said defect is located.

The present invention further relates to a diagnostic system adapted to localize a defect in a in-house access plant operable to carry broadband communication services.

A diagnostic system according to the invention comprises:
  a communication unit adapted to establish an automated and interactive communication session with a user of said in-house access plant, to instruct said user through said communication session to manipulate in-house equipment, and to receive through said communication session an interactive signal for each manipulation that is carried out,
  a measurement unit adapted to perform remote quality measurements over said in-house access plant while said in-house equipment are being manipulated,
  an analysis tool coupled to said timing unit and to said measurement unit, and adapted to identify, from timing information derived from said interactive signal and related to said each manipulation, and from said remote quality measurements, a particular manipulation that is time-correlated with a substantial change in measured quality, thereby identifying a particular piece of in-house equipment that has been manipulated and in the neighborhood of which said defect is located.

Embodiments of an analysis tool according to the invention, of a communication unit according to the invention and of a diagnostic system according to the invention correspond with the embodiments of a method according to the invention.

It is to be noticed that the term 'comprising', also used in the claims, should not be interpreted as being restricted to the means listed thereafter. Thus, the scope of the expression 'device comprising means A and B' should not be limited to devices consisting only of components A and B. It means that with respect to the present invention, the relevant components of the device are A and B.

Similarly, it is to be noticed that the term 'coupled', also used in the claims, should not be interpreted as being restricted to direct connections only. Thus, the scope of the expression 'device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

Figure 2:
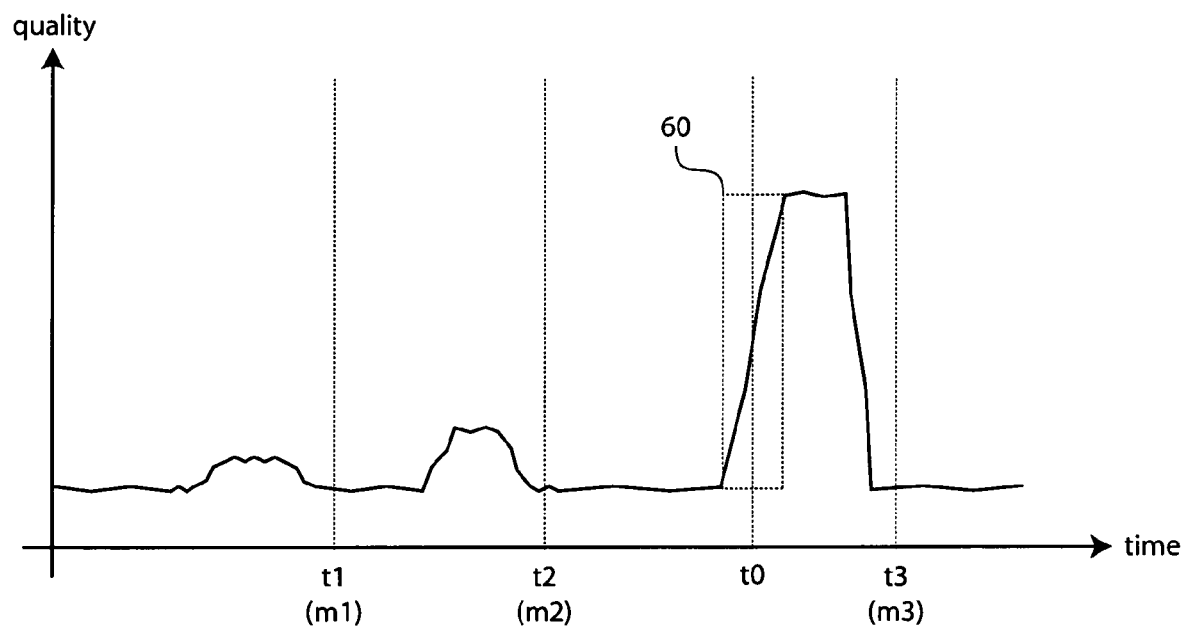

The above and other objects and features of the invention will become more apparent and the invention itself will be best understood by referring to the following description of an embodiment taken in conjunction with the accompanying drawings wherein:

FIG. 1 represents a communication system including a diagnostic system according to the invention, FIG. 2 represents quality measurements performed over a in-house access plant while in-house equipment are being manipulated.

There is seen in FIG. 1 customer premises 10 coupled to a central office 20 via a loop plant 1.

The customer premises 10 accommodates an access plant 50 that provides an access to both POTS and xDSL communication services.

The access plant 50 comprises a derivation box 11, in-house wirings 12a, 12b and 12c, phone sockets 13b, 13b and 13c and splitters 14a and 14b.

The derivation box 11 is coupled to the loop plant 1, and distributes the line signal towards the phone sockets 13a, 13b and 13c via the wirings 12a, 12b and 12c respectively.

The splitter 14a is coupled to the phone socket 13a and to a phone set 16a. The splitter 14b is coupled to the phone sockets 13b, to a phone set 16b and to a xDSL transceiver unit TU-R housed by a modem, a set top box, a network interface card, a router, a bridge, etc. The transceiver unit TU-R is further coupled to a data terminal 17, such as a Personal Computer (PC), a TV set, a game console, etc.

It is further assumed that the conductor pair 12c is incorrectly twisted and/or shielded, making this pair very sensitive to background noise, e.g. as induced by a washing machine 15.

The central office 20 accommodates a Local EXchange (LEX) 22 for connection towards a Public Switched Telephone Network (PSTN) 31, and a DSL Access Multiplexer (DSLAM) 23 for connection towards the Internet 32. A splitter 21 is coupled to the loop plant 1, to a line card of the LEX 22 (not shown) and to a transceiver unit TU-C of the access multiplexer 23.

The transceiver units TU-C and TU-R accommodate a measurement unit 43 and 44 respectively. The measurement units 43 and 44 are adapted to measure the quality (e.g., a Signal to Noise Ratio (SNR), a signal strength, a noise level, a channel capacity or line rate) of a xDSL signal that propagates in one or both directions between the transceiver units TU-C and TU-R through the loop plant 1 and through the in-house access plant 50. Such measurements are referred to as Dual End Line Testing (DELT), and can be performed while initializing a xDSL communication path between the transceiver units TU-C and TU-R (transceiver training), and/or while the xDSL communication path is operational and conveys user traffic (the so-called show time).

A diagnostic system 40 comprises an Intelligent Voice Responder (IVR) 41, an analysis tool 42, and remote measurement units such as the measurement units 43 and 44.

The IVR 41 is coupled to the PSTN 31. The analysis tool 42 is coupled, e.g. via a data communication network, to the IVR 41 and to the access multiplexer 23, and further to the measurement units 43 and 44.

The IVR 41 is adapted to establish an automated and interactive voice-communication session with an end-user.

The IVR 41 is further adapted to instruct in an autonomous and automatic way the end-user to manipulate in-house equipment, such as unplugging and/or replugging POTS devices, switching on and/or off in-house electro-equipment, etc.

The IVR 41 is further adapted to receive and to decode Dial Tone Multi-Frequency (DTMF) acknowledgment signals, and to derive timing information therefrom. The acknowledgment signals are sent whenever a new piece of in-house equipment is manipulated in accordance the supplied instructions.

In a preferred embodiment of the present invention, timing information of a particular manipulation are determined by time-stamping the receipt of the corresponding acknowledgment signal. The so-determined timing information are further associated with a particular manipulation identifier, such as a manipulation chronological number or a manipulation logical identifier, and are sent to the analysis tool 42 for further processing.

The IVR 41 is further adapted to send a start signal to the analysis tool 42 whenever such an automatic and interactive communication session is initiated. The start signal further comprises information for identifying a particular subscriber line, such as a subscriber phone number.

The analysis tool 42 is adapted to start quality measurements upon receipt of this start signal. This is achieved by first identifying the access multiplexer whereto the subscriber is coupled, and then requests the, so-identified access multiplexer to perform quality measurements over a particular subscriber line, the identity of the access multiplexer and of the subscriber line being derived from the start signal.

The IVR 41 is further adapted to send a stop signal to the analysis tool 42 that indicates the completion of all the requested manipulations.

Upon receipt of this stop signal, the analysis tool 42 stops and collects quality measurements for further analysis.

An operation of the preferred embodiment follows.

A user 18 sited at the customer premises 10 dials-in a dedicated phone number by means of the phone set 16a. The voice call is routed through the PSTN 31 towards the IVR 41.

Upon establishment of the voice call, the IVR 41 sends a start signal start to the analysis tool 42 comprising the calling party number (the called party number for an outgoing call).

Upon receipt of the signal start, the analysis tool 42 translates the supplied phone number into a particular access multiplexer, presently the access multiplexer 23, and a particular subscriber port on that access multiplexer. Next, the analysis tool 42 sends a control signal meas—start to the access multiplexer 23 for requesting quality measurements over that subscriber port.

Thereupon, the access multiplexer 23 requests the measurement units 43 and 44 to start reporting quality measurements at regular time interval (e.g., every second).

Meanwhile, the user 18 follows the instructions of the IVR 41.

For localizing a missing or defective filter, the user 18 is invited to unplug and then replug after a short while each and every POTS device, such as a phone set, a fax machine, etc, while making sure that one POTS device at least is connected and off-hook in order to keep the call alive. The user shall acknowledge the manipulation by pushing a particular key. When all the POTS device have been so-manipulated, the user is invited to push another key.

Presently and while the phone set 16a is kept off-hook, the user 18 goes to the next POTS device, presently the phone set 16b, disconnects and reconnects the phone set 16b (m1), off-hooks the phone set 16b, confirms the manipulation by pushing a first key (ack1) and lets the phone set 16b off-hook. The user 18 comes back to the phone set 16a, disconnects and then reconnects the phone set 16a (m2), off-hooks the phone set 16a, confirms the manipulation by pushing the same first key (ack2), and on-hooks the phone set 16a. Then, the user 18 comes back to the phone set 16b, pushes a second key to indicate that all the POTS device have been manipulated according to the supplied instructions, and listens to the following instructions.

For localizing bad-quality in-house wiring, the user 18 is further invited to switch on or off potential sources of noise, such as a dimmer, an engine, an electrical pump, a washing machine, an hair dryer, etc.

The user 18 goes to the cellar, identify the washing machine 15 that is turned on as a potential disturber, switch off the washing machine 15 (m3), comes back to the phone set 16b and pushes the first key (ack3). The process keeps on until the potential sources of noise have been switched on or off. The user 18 pushes the second key to indicate that all the identified sources of noise have been switched on or off (term), and then waits for the results.

Upon detection of the acknowledgement signal term, the IVR 41 sends a stop signal stop to the analysis tool 42. The signal stop comprises the timing information t1, t2, t3 of the manipulation m1, m2, m3 respectively.

Thereupon, the analysis tool 42 sends a control signal meas—stop to the access multiplexer 23.

Thereupon, the access multiplexer 23 stops and collects the last measurements from the measurement units 43 and 44, and sends a measurement report meas_rep back to the analysis tool 42 for further analysis. Measurement results might be reformatted by the access multiplexer 23 for easier analysis.

The analysis tool 42 next looks for any substantial change in the measured quality, presently 60, and identifies a particular manipulation, presently m3, that is time-correlated with this substantial change, presently following immediately in time the identified substantial change.

The analysis tool finally returns the so-identified manipulation to the IVR 41, that relays the information to the user 18 by means of a voice synthesizer.

The user 18 can then investigate nearby the washing machine 15 for localizing the defect, presently the badly twisted pair 12c that connects the derivation box 11 to the phone socket 13c.

In an alternative embodiment of the present invention, the automated and interactive communication session involves a plurality of phone calls. The end-user is explained that he is going to be called several times, and that he shall pick up every time a different phone set, hang up and unplug the phone set without delay. When the last phone set is to be unplugged, the end-user shall press a particular key before hanging up. The end-user shall wait for the next call to get the results, meanwhile replugging at least one phone set.

The IVR 41 sends the start signal to the analysis tool 42 before calling repetitively the end-user. The timing information are derived from the call termination signals. When the special key is pushed, the IVR 41 waits for the next call termination signal and, after a guard time (enough to let the user unplug the last phone set), sends the stop signal to the analysis tool 42 together with the so-determined timing information. The IVR 41 calls back the user as soon as the results are available.

It is to be noticed that the so-determined timing information precede the actual manipulation times (as opposed to the preferred embodiment where the acknowledgment signals are sent after in-house equipment have been manipulated) and that the analysis algorithm has to be modified accordingly.

In still an alternative embodiment, the acknowledgment signals are forwarded, possibly after reformatting, to the analysis tool 42. The analysis tool 42 determines the timing information by time-stamping the receipt of the acknowledgement signals. Forwarding the acknowledgment signals to the analysis tool 42 allows the latter to perform discrete measurements whenever a new manipulation is carried out (as opposed to continuously monitoring the line quality irrespective of the manipulation occurrence), thereby lessening the measurement load within the communication system. The access multiplexer 23 may for instance restart the DSL link, and wait for the new achievable line rate as determined by the transceiver training.

In still an alternative embodiment, the automated and interactive communication session is initiated by the analysis tool 42. The analysis tool 42 sends a start signal to the IVR 41, which start signal comprising a phone number to be called.

The communication session may also be triggered from another server that synchronizes the operation of both the IVR 41 and the analysis tool 42.

In still an alternative embodiment of the present invention, the end-user is instructed to take notice of times whenever a new piece of in-house equipment is manipulated. In this embodiment, no acknowledgment signal is sent through the communication session, neither are timing information derived therefrom. When all the manipulations are completed, the analysis tool simply returns a reference time to at which a substantial change in measured quality is detected. This information is further relayed to the end-user (through the same or a further call) who time-correlates his own timing information with the reference time t0.

In still an alternative embodiment of the present invention, voice over DSL is used in place of the legacy PSTN.

In still an alternative embodiment, a web server coupled to the Internet 32 is used in lieu of the IVR 41. The end-user is instructed to manipulate in-house equipment through a web interface implemented by the web server, and confirms the manipulations that were carried out by e.g. pushing a special button or by clicking a special link. The measurement results or the analysis results (depending on where the analysis step is done) are then returned to the end-user via the web interface. This embodiment is particularly advantageous if the user is not delivered POTS, or if the user wants to get into further detailed information for further troubleshooting.

In still an alternative embodiment, a Single End Line Testing (SELT) unit is implemented in the transceiver unit TU-R that is remotely controllable by the analysis tool 42 through the access multiplexer 23. By so doing, the analysis tool 42 can identify in-house wiring defects with a high accuracy. A SELT unit may also be present at central office (as part of the transceiver unit TU-C, or as a separate test unit), also such a location is not well suited for troubleshooting in-house wiring problems.

In still an alternative embodiment, other measurement techniques are used in lieu of or in addition to DELT and SELT, such as probing remotely the presence of a filter, etc.

It is to be noticed that more than one substantial change in measured quality can be observed, and that more than one particular piece of in-house equipment related to one or more defect can be identified.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method for localizing a defect in an in-house access plant operable to carry broadband communication services, said method comprising:

establishing, by at least one communication device within a diagnostic system, an automated and interactive communication session with a user of said in-house access plant;

instructing said user through said communication session to manipulate in-house equipment;

determining, by the at least one analysis device within the diagnostic system, timing information for each manipulation that is carried out;

performing, by the at least one measuring device within the diagnostic system, remote quality measurements over said in-house access plant while said in-house equipment are being manipulated;

identifying, by the at least one analysis device, from said timing information a particular manipulation that is time-correlated with a substantial change in measured quality, thereby identifying a particular piece of in-house equipment that has been manipulated and in the neighborhood of which said defect is located.

2. The method according to claim 1, said method further comprising:

instructing said user through said communication session to take notice of times at which said in-house equipment are manipulated, thereby determining said timing information, wherein said identification step is performed by said user.

3. The method according to claim 1, said method further comprising:

receiving through said communication session an interactive signal for said each manipulation, such that said timing information is derived, wherein said identification step is performed by an analysis tool.

4. The method according to claim 1, wherein said communication session is a phone call guided by an intelligent voice responder.

5. The method according to claim 1, wherein said communication session is based upon a web interface.

6. The method according to claim 1, wherein said defect is at least one of a missing and defective splitter separating a broadband signal from a narrowband signal, and in that said user is instructed to unplug narrowband devices.

7. The method according to claim 1, wherein said defect is bad quality in-house wiring, and said user is instructed to switch on or off in-house electro-equipment causing one of noise increase and decrease on said in-house access plant through radiations picked up by said bad quality in-house wiring.

8. An analysis tool adapted to send a control signal whereupon remote quality measurements are performed over a in-house access plant operable to carry broadband communication services, characterized in that said analysis tool is operable to form part of a diagnostic system capable of localizing a defect in said in-house access plant, and in that said analysis tool is further adapted:

to synchronize said control signal with an automated and interactive communication session established with a user of said in-house access plant, though which said user is instructed to manipulate in-house equipment, and through which an interactive signal is received for each manipulation that is carried out, to identify, from timing information derived from said interactive signal and related to said each manipulation, and from said remote quality measurements, a particular manipulation that is time-correlated with a substantial change in measured quality, thereby allowing identification of a particular piece of in-house equipment that has been manipulated and in the neighborhood of which said defect is located.

9. A communication unit adapted to establish an automated and interactive communication session with a user of a in-house access plant operable to carry broadband communication services, characterized in that said communication unit is operable to form part of a diagnostic system capable of localizing a defect in said in-house access plant, and in that said communication is further adapted:

to instruct said user through said communication session to manipulate in-house equipment, to receive through said communication session an interactive signal for each manipulation that is carried out, whereby timing information related to said each manipulation are derived, to send a synchronization signal whereupon remote quality measurements are performed over said in-house access plant, which remote quality measurements being performed while said in-house equipment are being manipulated, thereby allowing identification, from said timing information and from said remote quality measurements, of a particular manipulation that is time-correlated with a substantial change in measured quality, and further of a particular piece of in-house equipment that has been manipulated and in the neighborhood of which said defect is located.

10. A diagnostic system adapted to localize a defect in a in-house access plant operable to carry broadband communication services, said diagnostic system comprises:

a communication unit adapted to establish an automated and interactive communication session with a user of said in-house access plant, to instruct said user through said communication session to manipulate in-house equipment, and to receive through said communication session an interactive signal for each manipulation that is carried out, a measurement unit adapted to perform remote quality measurements over said in-house access plant while said in-house equipment are being manipulated, an analysis tool coupled to said timing unit and to said measurement unit, and adapted to identify, from timing information derived from said interactive signal and related to said each manipulation, and from said remote quality measurements, a particular manipulation that is time-correlated with a substantial change in measured quality, thereby identifying a particular piece of in-house equipment that has been manipulated and in the neighborhood of which said defect is located.

* * * * *